(12) United States Patent
Webb

(10) Patent No.: US 11,548,483 B2
(45) Date of Patent: Jan. 10, 2023

(54) KIT FOR TRANSFORMING A HOT ROD INTO AN ELECTRIC CAR

(71) Applicant: WEBB MOTOR WORKS LTD., Victoria (CA)

(72) Inventor: Chris Webb, Victoria (CA)

(73) Assignee: Webb Motor Works Ltd.

( * ) Notice: Subject to any disclaimer, the term of this patent is extended or adjusted under 35 U.S.C. 154(b) by 133 days.

(21) Appl. No.: 17/078,882

(22) Filed: Oct. 23, 2020

(65) Prior Publication Data

US 2021/0122336 A1 Apr. 29, 2021

(30) Foreign Application Priority Data

Oct. 23, 2019 (CA) ................................ CA 3060096

(51) Int. Cl.
*B60S 5/06* (2019.01)
*B60L 50/60* (2019.01)
*B60K 1/00* (2006.01)

(52) U.S. Cl.
CPC ................. *B60S 5/06* (2013.01); *B60L 50/66* (2019.02); *B60K 1/00* (2013.01); *B60K 2001/006* (2013.01)

(58) Field of Classification Search
CPC ........................... B60K 2001/006; B60L 50/66
See application file for complete search history.

(56) References Cited

U.S. PATENT DOCUMENTS

| 4,149,512 A * | 4/1979 | Hatz | F02B 77/13 |
| | | | 123/195 S |
| 2005/0132997 A1* | 6/2005 | Vargas | F02F 7/006 |
| | | | 123/195 C |
| 2006/0070599 A1* | 4/2006 | Nonogaki | F02M 35/10321 |
| | | | 123/195 C |
| 2010/0269779 A1* | 10/2010 | Sammons | F02F 7/006 |
| | | | 123/195 C |

FOREIGN PATENT DOCUMENTS

CA 2923368 9/2016

* cited by examiner

*Primary Examiner* — James M Dolak
*Assistant Examiner* — James J Triggs
(74) *Attorney, Agent, or Firm* — Baumgartner Patent Law; Marc Baumgartner

(57) ABSTRACT

A combination for transforming a gasoline powered Chevrolet V8 engine into an electrically powered Chevrolet V8 engine is provided, the combination comprising: a faux transmission housing; a bell housing attached to a front end of the faux transmission housing; a faux engine attached to a front of the bell housing; and an electric motor, wherein the combination is free-standing and comprises a plurality of castings assembled to provide a faux transmission case in which the electric motor is housed, and a faux engine case configured to house a plurality of rechargeable batteries.

10 Claims, 11 Drawing Sheets

KIT FOR TRANSFORMING A HOT ROD INTO AN ELECTRIC CAR

CROSS REFERENCE TO RELATED APPLICATIONS

This application claims benefit of Canadian Patent Application Serial No. 3,060,096, filed on Oct. 23, 2019, entitled KIT FOR TRANSFORMING A HOT ROD INTO AN ELECTRIC CAR, the contents of which are incorporated herein by reference.

FIELD

The present technology allows a user to transform a car with a V8 engine into an electric car that retains the look of the V8 engine. More specifically, it is an easy to use kit comprising an electric motor and a case for housing the electric motor such that the car retains the appearance of the original car.

BACKGROUND

With the growing number of electric cars, hotrodders and car enthusiasts have begun to see the advantages of an electric motor driven vehicle. The older cars are very fuel inefficient, the engines are getting old and more and more difficult to find parts for and the engines lack the torque of an electric engine. Unfortunately, replacing the gas engine with an electric motor destroys the look of the engine compartment. Many car enthusiasts want to retain as much of the look of their older vehicle as possible. There are examples of engine covers and replacement parts that can be used to change the look of a gas engine.

In a related art, United States Patent Application 20050132997 discloses a customization cover for use with an engine valve cover that has a main body portion configured with one or more design elements thereon to provide an improved visual effect for a vehicle engine and engine compartment. Mounting openings in the main body member are cooperatively configured to receive a connector element to place the customization cover generally above the valve cover. Preferably, side components having side design elements extend downwardly from the main body to from a generally elongated channel that is disposed above the valve cover. The connector elements can connect to the valve cover mounting points or to the ignition coil mounting points. Spacer elements, brackets and/or mounting arms on the side components can be utilized to secure the customization cover in a spaced apart relation to the valve cover to provide an enhanced three-dimensional visual effect. This simply adds decorative elements to the engine valve cover and does not shroud the engine. The result is not an engine that has the appearance of a V8 engine.

United States Patent Application 20100269779 discloses a valve cover that includes a base that attaches to an engine and a display window that attaches to the base. The display window is made of material that can withstand the operating environment of the engine, including temperature and resistance to petroleum-based substances. The display window is secured to the base using a flexible gasket that encircles the display window and snaps into a groove in the base to secure the display window to the base. The display window may be see-through so the valves are visible. The display window may also include one or more display elements, such as light-emitting diodes, optical fibers, electro-luminescent panels, incandescent bulbs, liquid crystal displays, etc. The display window may include embossed or etched portions and may include multiple colors and sequenced operation to provide any desired effect on the display panel. The result is not an engine that has the appearance of a V8 engine.

United States Patent Application 20060070599 discloses an engine cover includes an installation member, a cover body, and an installed member. The installation member is disposed on an engine. One of the installation member and the installed member includes a leg, and a head, and the other one of them includes a framed member, and an elastic member. The elastic member includes a first hole, a second hole, and a diametrically-enlarged intermediate hole. The head engages with the diametrically-enlarged intermediate hole. Moreover, the head is disposed movably toward the second hole when a downward load is applied to the cover body, thereby bringing the cover body closer to the engine. The result is not an engine that has the appearance of a V8 engine.

U.S. Pat. No. 4,149,512 discloses an internal combustion engine having a sound-deadening shroud surrounding the engine block and connected to latter with the interposition of anti-vibration means. An exhaust plant through which combustion gases are connected is arranged external of the shroud and connected to the engine block. A separate enclosure is secured to the shroud and encloses the exhaust plant leaving a small air gap on all sides between the exhaust plant and the enclosure with only the exhaust pipe of the exhaust plant projecting from the enclosure through an opening. The result is not an engine that has the appearance of a V8 engine.

Canadian Patent 2923368 discloses a kit for shrouding a stock gasoline powered engine to make it appear as a flathead engine, the kit comprising a timing cover casting, a front casting, a pair of exhaust manifold panel castings, a pair of valve cover castings, a pair of support bars, an intake manifold casting, a rear casting, and instructions. Also provided are a method of manufacturing the kit, a method of assembling the kit and a faux flathead engine. The design relies on the large size of the small block engine. The result is not an engine that has the appearance of a V8 engine.

With the strong growth in electric cars, it is only a matter of time before hot rod enthusiasts will be using electric motors to power their hot rods. None of the prior art addresses the need for a kit that allows such a transformation while retaining the look of the original engine. What is needed is a kit and product that provides a case or shroud for an electric motor that results in it appearing to be a V8, V12 or V16 engine. The kit would preferably be easy to install and would encase the entire electric motor. It would be best if it could be installed in a matter of hours.

SUMMARY

The present technology provides an easy to assemble kit, or the already assembled free-standing shroud for a stock electric motor that results in it appearing to be a V8 engine, more specifically a Chevrolet V8 engine. The stock electric motor is housed in the cavity of the shroud and is completely concealed or is housed in the faux transmission housing. A large void volume in the cavity and numerous concealed openings promotes air flow and thus cooling for the electric motor. The kit can be assembled and installed in a matter of hours. The shroud can be configured for a V12 or V16, by simply extending the side piece molds for the V8, whilst using the same molds for the remainder of the parts for production. The product is a shroud and electric motor that mimics a gasoline engine in exterior appearance. The shroud is light weight.

In one embodiment, a combination for transforming an internal-combustion vehicle into an electric vehicle, while retaining the physical appearance of an internal-combustion vehicles is provided, the combination comprising: a faux transmission housing; a bell housing attached to a front end of the faux transmission housing; a faux engine attached to a front of the bell housing; and an electric motor, wherein the combination is free-standing and comprises a plurality of castings assembled to provide a faux transmission case in which the electric motor is housed, and a faux engine case configured to house a plurality of rechargeable batteries.

In the combination, the faux transmission housing may be spaced apart from the electric motor to define a void volume surrounding the electric motor.

In the combination, the internal-combustion vehicle is powered by a Chevrolet V8 engine.

In the combination, the plurality of castings may include a timing cover casting, a back casting opposite the timing cover casting and a pair of side castings disposed therebetween.

In the combination, the plurality of castings may include a pair of head castings which are hollow, sit on top of the pair of side castings and extend between the timing cover casting and the back casting.

In the combination, the plurality of castings may include an intake manifold casting, which sits between the pair of heads and extends between the timing cover casting and the back casting.

The combination may further comprise a pair of stock valve covers which are mounted on the pair of heads.

The combination may further comprise a microprocessor, the microprocessor in electronic communication with the electric motor.

In the combination, the pair of side castings may mimic a lower side of a block and the oil pan of the Chevrolet V8 engine.

In the combination, the pair of side castings may include a plurality of apertures, the faux engine further comprising a plurality of pipes attached to and extending from the apertures to provide a fluid connection between the case and the ambient environment.

The combination may further comprise the plurality of rechargeable batteries.

The combination may further comprise: a battery case which is housed in the faux engine; and fuses, which are housed in the battery case and are in electrical communication with the electric motor and the rechargeable batteries.

In another embodiment, a kit for transforming an internal-combustion vehicle into an electric vehicle, while retaining the physical appearance of an internal-combustion vehicles, the kit comprising: a faux transmission housing including a plurality of castings, which when assembled provide a case for housing an electric motor; a bell housing; and a faux engine including a plurality of castings, which when assembled provide a case for housing a plurality of rechargeable batteries.

The kit may further comprise a battery case and a plurality of wires.

In the kit, the plurality of castings may include a timing cover casting, a back casting and a pair of side castings.

In the kit, the plurality of castings may include a pair of head castings which are hollow.

In the kit, the plurality of castings may include an intake manifold casting.

The kit may further comprise a pair of stock valve covers.

The kit may further comprise the electric motor.

The kit may further comprise a microprocessor.

In the kit, the internal-combustion vehicle is powered by a Chevrolet V8 engine.

In one embodiment, a faux engine is provided, the faux engine comprising an electric motor, a transmission in motive communication with the electric motor, a transmission housing surrounding the transmission and a free-standing case for the electric motor, wherein the case comprises a plurality of castings assembled to provide a cavity to house the electric motor, is configured to conceal the electric motor and mimic an exterior of a V8 engine.

In the faux engine, the case may be spaced apart from the electric motor to define a void volume surrounding the electric motor.

In the faux engine, the plurality of castings may include a timing cover casting, a back casting opposite the timing cover casting and a pair of side castings disposed therebetween.

In the faux engine, the plurality of castings may include a pair of head castings which are hollow, sit on top of the pair of side castings and extend between the timing cover casting and the back casting.

In the faux engine, the plurality of castings may include an intake manifold casting, which sits between the pair of heads and extends between the timing cover casting and the back casting.

The faux engine may further comprise a pair of stock valve covers which are mounted on the pair of heads.

In the faux engine, the plurality of castings may be aluminum castings that are welded to one another.

The faux engine may further comprise a microprocessor, the microprocessor in electronic communication with the electric motor and the transmission.

In the faux engine, the pair of side castings may mimic a lower side of a block and the oil pan of the V8 engine.

In the faux engine, the pair of side casting may define an opening between the cavity and an ambient environment.

In the faux engine, the pair of side castings may include a plurality of apertures, the faux engine further comprising a plurality of pipes attached to and extending from the apertures to provide a fluid connection between the cavity and the ambient environment.

In another embodiment, a free-standing V8 shroud for an electric motor is provided, the free-standing V8 shroud comprising a plurality of castings assembled to provide a cavity, the cavity for housing the electric motor, and an exterior, the exterior configured to mimic an exterior of a CV8 engine, and to conceal the electric motor.

In the free-standing V8 shroud, the plurality of castings may include a timing cover casting, a back casting opposite the timing cover casting and a pair of side castings disposed therebetween.

In the free-standing V8 shroud, the pair of side castings may mimic a lower side of a block and the oil pan of the V8 engine.

In the free-standing V8 shroud, the pair of side casting may define an opening between the cavity and an ambient environment.

In the free-standing V8 shroud, the pair of side castings may include a plurality of apertures, the free-standing V8 shroud further comprising a plurality of pipes attached to and extending from the apertures to provide a fluid connection between the cavity and the ambient environment.

The free-standing V8 shroud may further comprise a pair of stock valve covers which are mounted on the pair of heads.

In the free-standing V8 shroud, the plurality of castings may include a pair of head castings which are hollow, sit on top of the pair of side castings and extend between the timing cover casting and the back casting.

In another embodiment, a kit for changing a V8 engine to an electric motor is provided, the kit comprising an electric motor and a case for the electric motor, the case comprising a plurality of castings which when assembled provide a cavity, the cavity for housing the electric motor, and an exterior, the exterior configured to mimic an exterior of the V8 engine, and to conceal the electric motor.

In the kit, the plurality of castings may include a timing cover casting, a back casting and a pair of side castings.

In the kit, the pair of side castings may mimic a lower side of a block and the oil pan of the V8 engine.

FIGURES

DETAILED DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Stock electric engine: In the context of the present technology, a stock electric engine is the engine that is used to run the vehicle and is made to look like a gasoline engine with the shroud. This could be, for example, but not limited to, one or two electric motors.

Short block: A short block is the engine block.

Long block: A long block is the engine block and the two heads.

Gasoline engine: A gasoline engine is a long block with an intake manifold, two valve covers and an oil pan.

Figure 1:
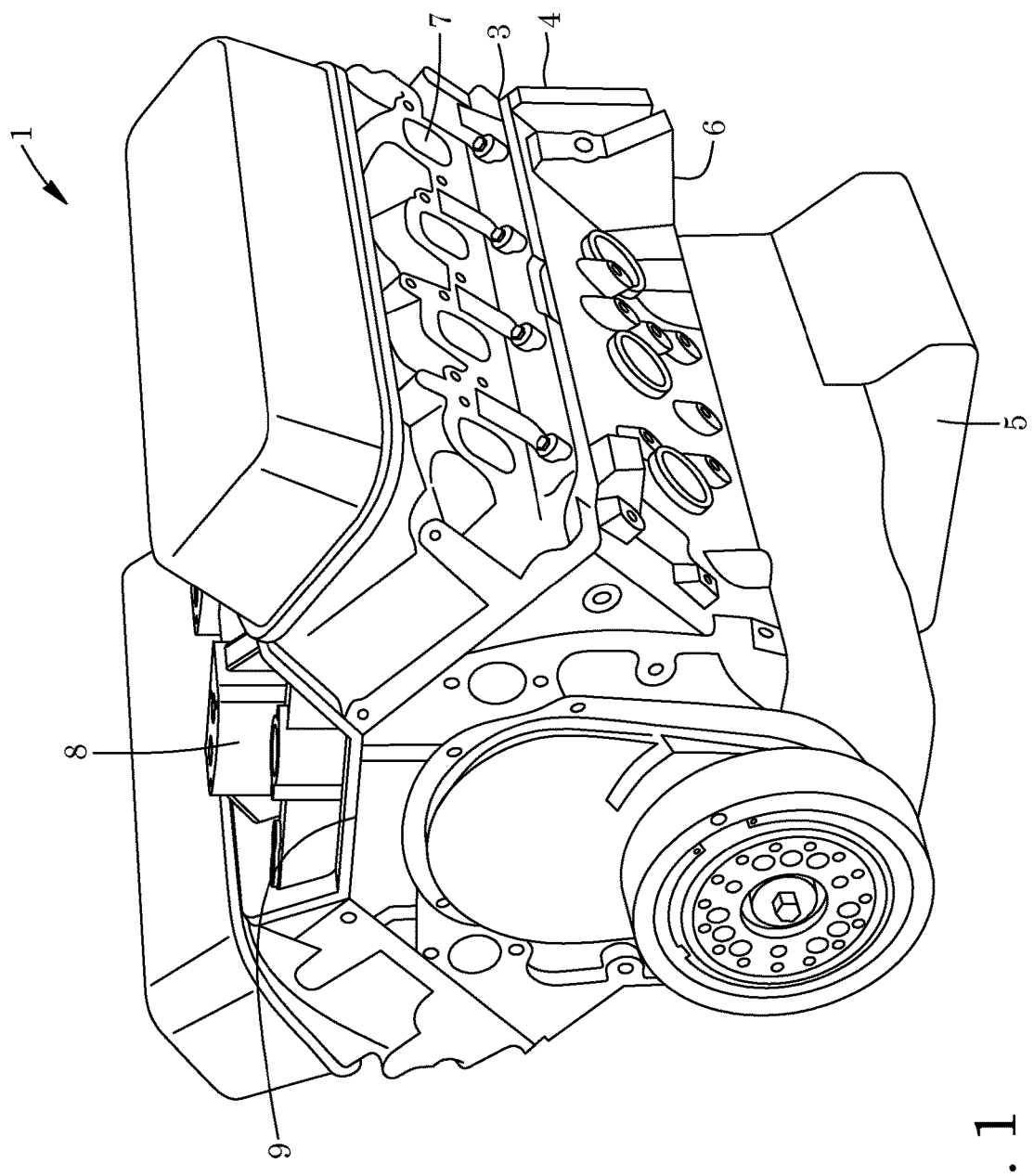
FIG. 1 is a perspective view of a prior art V8 engine.

A prior art V8 engine, generally referred to as 1 is shown in FIG. 1. The block 2 includes upper sides 3 and lower sides 4. An oil pan 5 is attached to the bottom 6 of the block 2. A pair of heads 7 is attached to the upper sides 3. An intake manifold 8 is attached to the top 9 of the block 2. The front and the back have their profile defined by the shape of the block 2 as shown.

Figure 2:
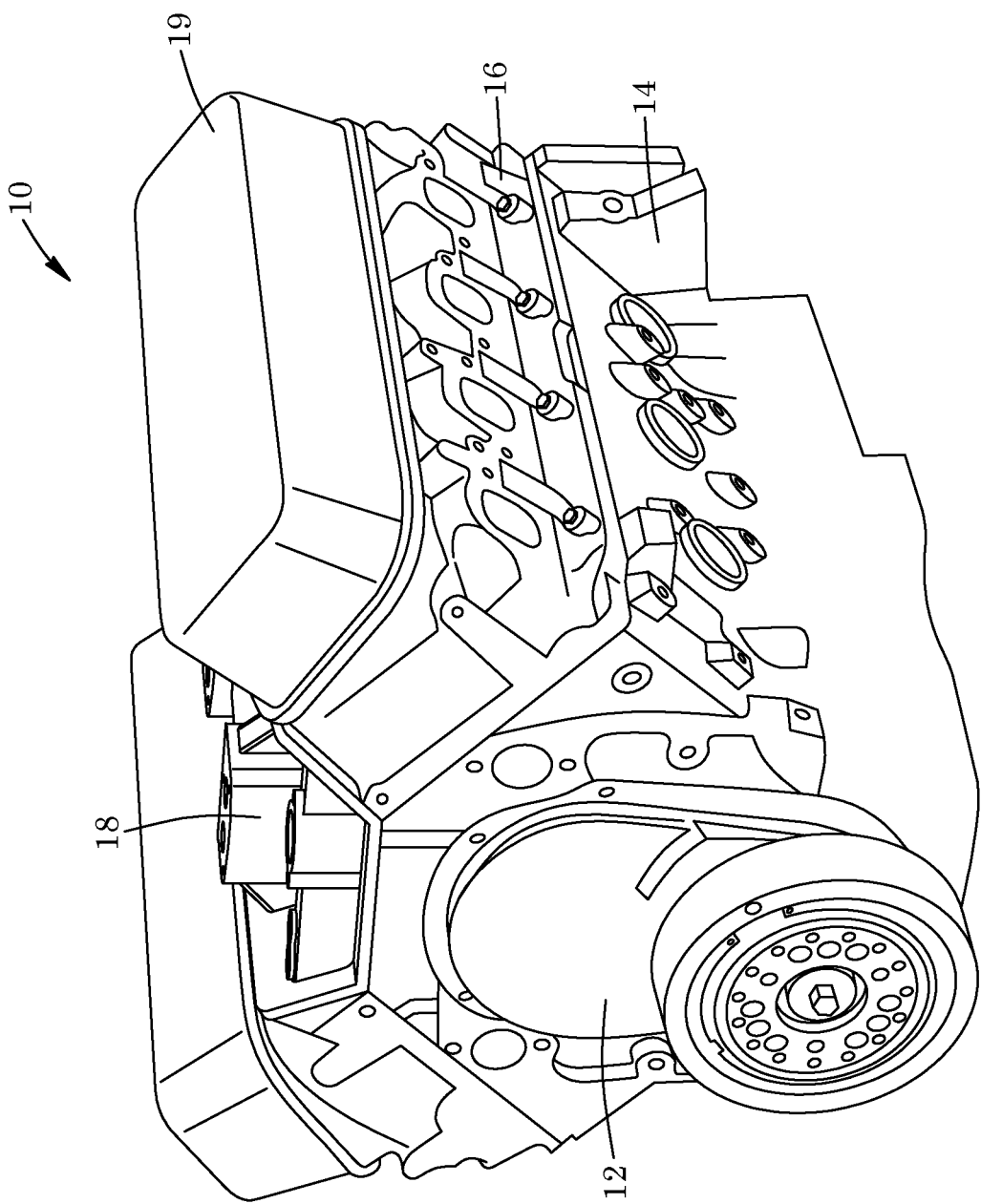
FIG. 2 is a perspective view of the assembled shroud of the present technology.

An engine shroud, generally referred to as 10 is shown in FIG. 2. The shroud 10 is comprised of between three and seven, generally four sections of cast aluminum that, when assembled, mimics the look of a Chevrolet V8 engine. A timing cover casting 12, a right side casting 14, a right side head casting 16 and an intake manifold casting 18 can be seen. In all embodiments, the valve covers 19 are stock, as they are light weight components.

In another embodiment, the shroud mimics the look of a Ford V8 engine.

Figure 3:
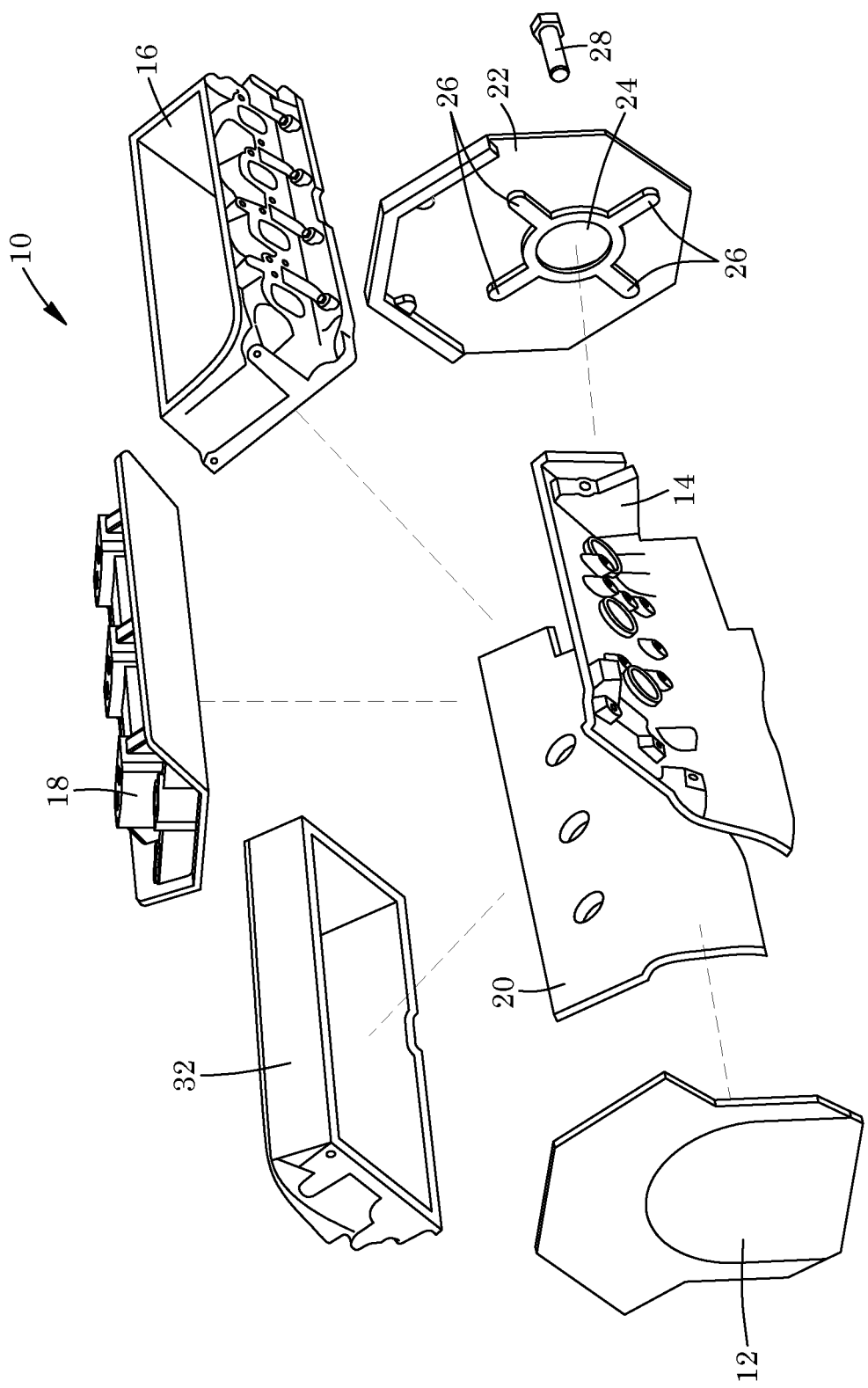
FIG. 3 is an exploded view of the shroud of the present technology.

As shown in FIG. 3, there are two side castings, the right side casting 14 and a left side casting 20. The right and left side castings 14, 20 mimic both the oil pan and the lower sides of the block of a V8 engine. The back casting 22 includes an aperture 24 and four motor mounts 26 extending outward from the aperture 24 as four raised bars. The profile of the back casting 22 is the same as the profile of the back of the stock V8 block 1. Bolts 28 bolt the back casting 22 to the transmission casing of the car. The timing cover casting 12 mimics the timing cover of a V8 engine. It has the same profile as the front of the stock V8 block 1. In order to save weight and to promote heat transfer from the electric motor to the ambient, the right head and the left head of the V8 engine are mimicked with a right head casting 16 and a left head casting 32. The head castings 16, 32 include four exhaust apertures 34 each. The head castings 16, 18 are hollow so as to promote cooling and air flow, as well as to reduce weight. In one embodiment, the exhaust apertures 34 are fitted with short exhaust pipes 36. Cooling air enters into the motor cavity 38 (see FIG. 6) through the pipes 36 and the exhaust apertures 34. The intake manifold casting 18 also saves weight and promotes heat transfer from the motor cavity 38.

Figure 4A:
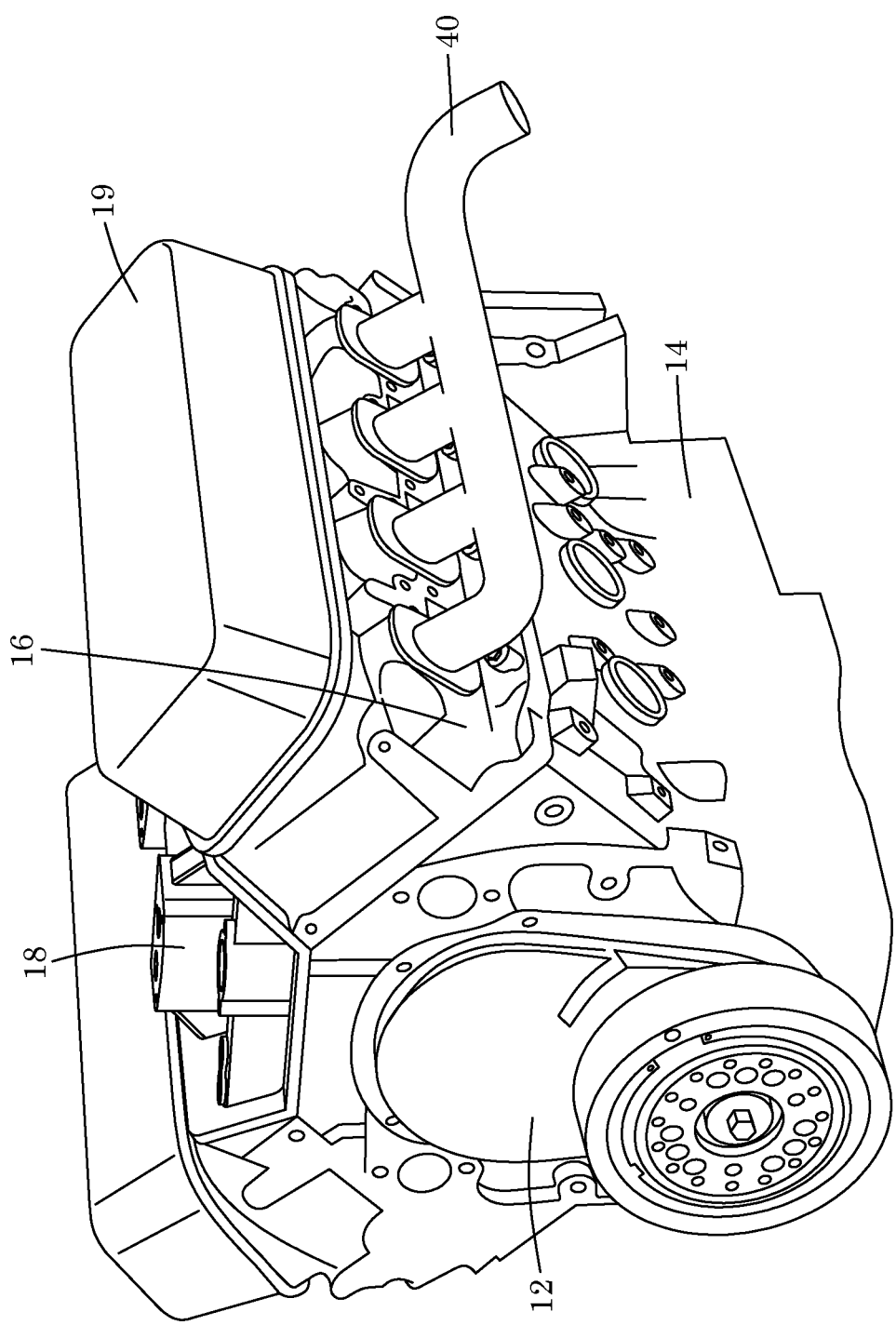
FIG. 4A is a perspective view of an alternative embodiment of the shroud of FIG. 1.

In another embodiment shown in FIG. 4A, stock right 40 and left exhaust manifolds 42 (not shown) are attached to the right and left head castings 16, 32 (not shown). In this embodiment, the intake manifold casting 18 is replaced with a stock intake manifold 44 to provide a faux engine.

Figure 4B:
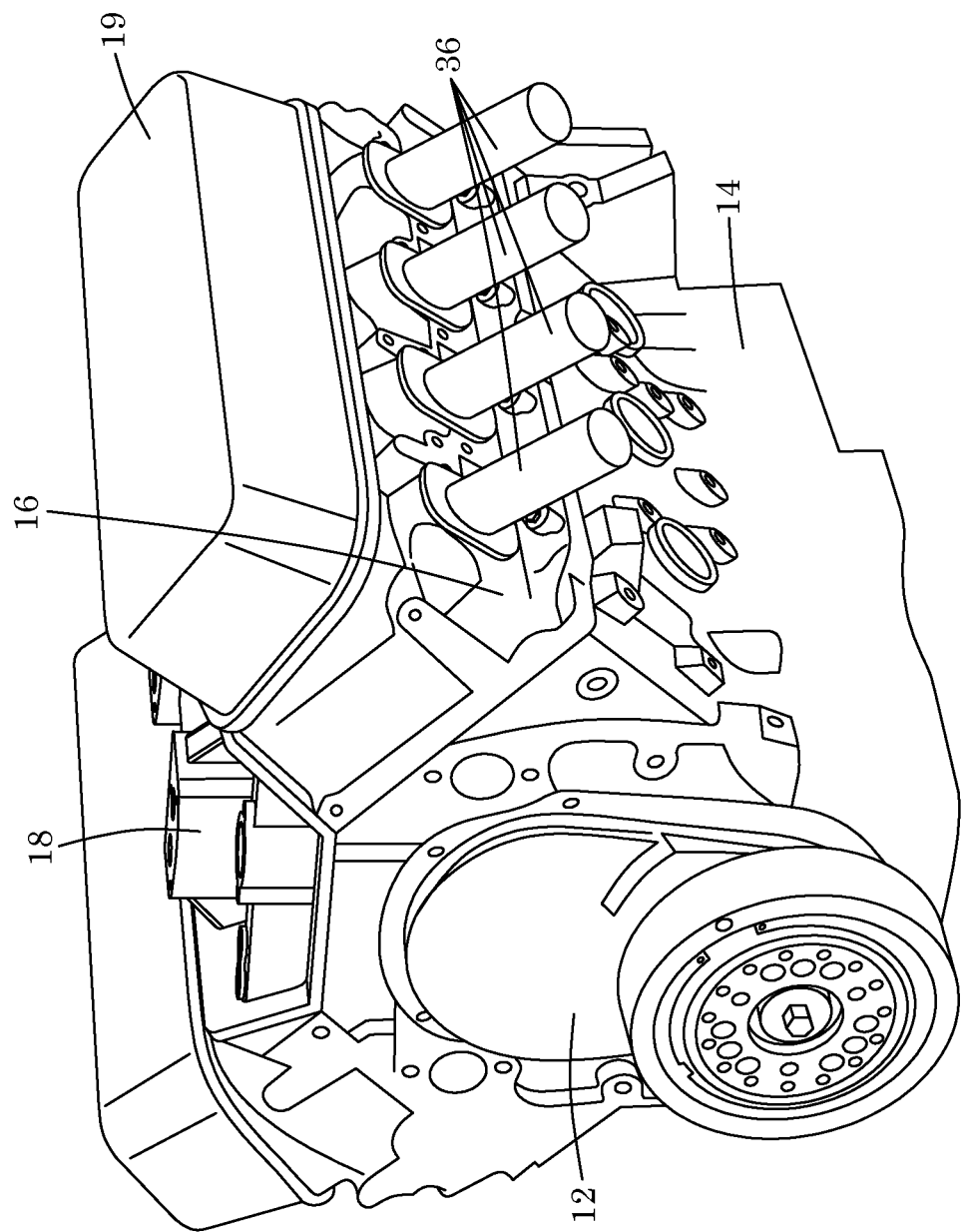
FIG. 4B is a perspective view of another alternative embodiment of the shroud of FIG. 1.
Figure 4C:
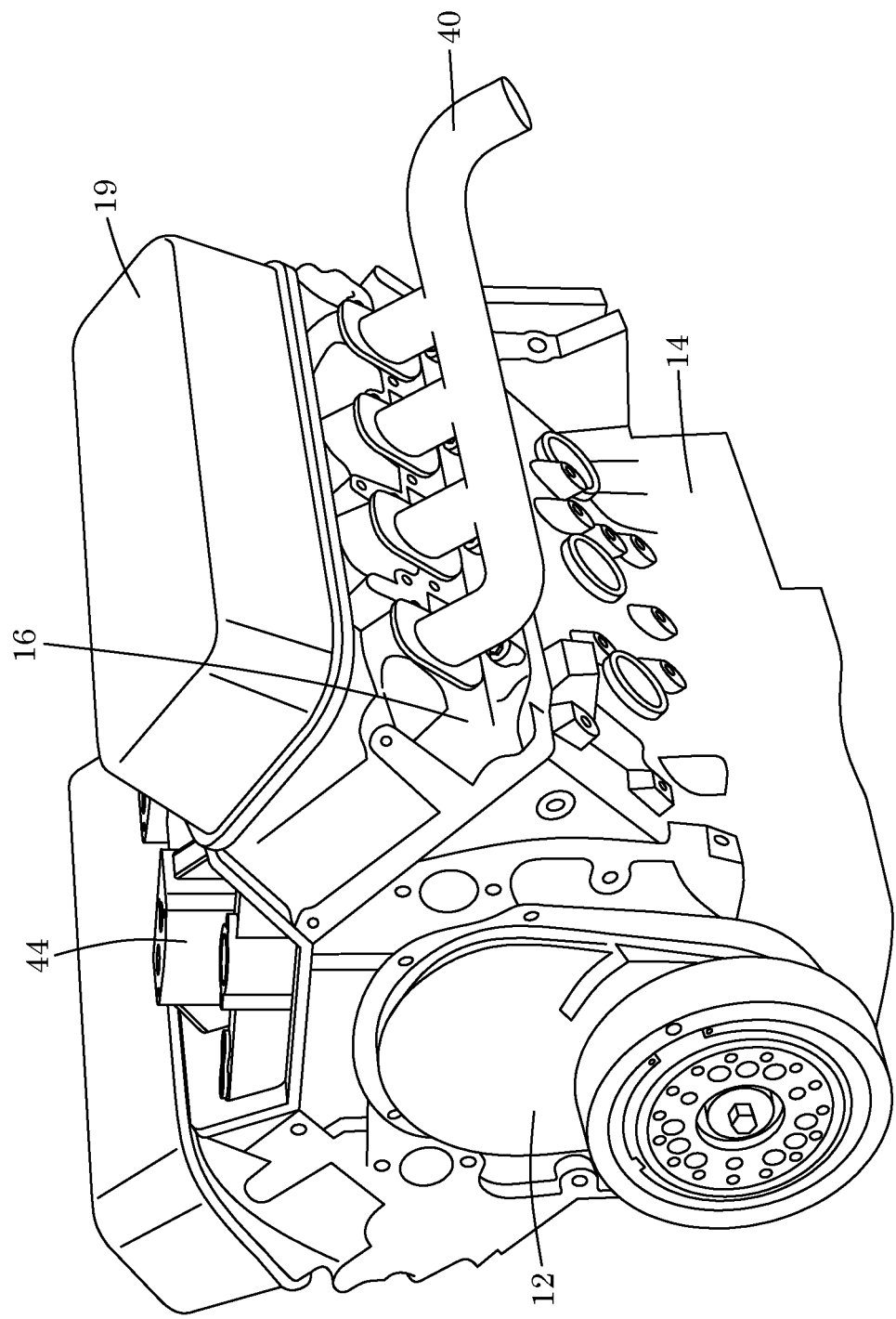
FIG. 4C is a perspective view of yet another alternative embodiment of the shroud of FIG. 2.

In another embodiment shown in FIG. 4B, short exhaust pipes 36 are attached to the right and left head castings 16, 32 and the intake manifold casting 18 is replaced with the stock intake manifold 44. In yet another embodiment shown in FIG. 4C, the stock right 40 and left exhaust manifolds 42 (not shown) are attached to the right and left head castings 16, 32 (not shown) and the intake manifold casting 18 replaces the stock intake manifold 44 to provide a faux engine.

Figure 5:
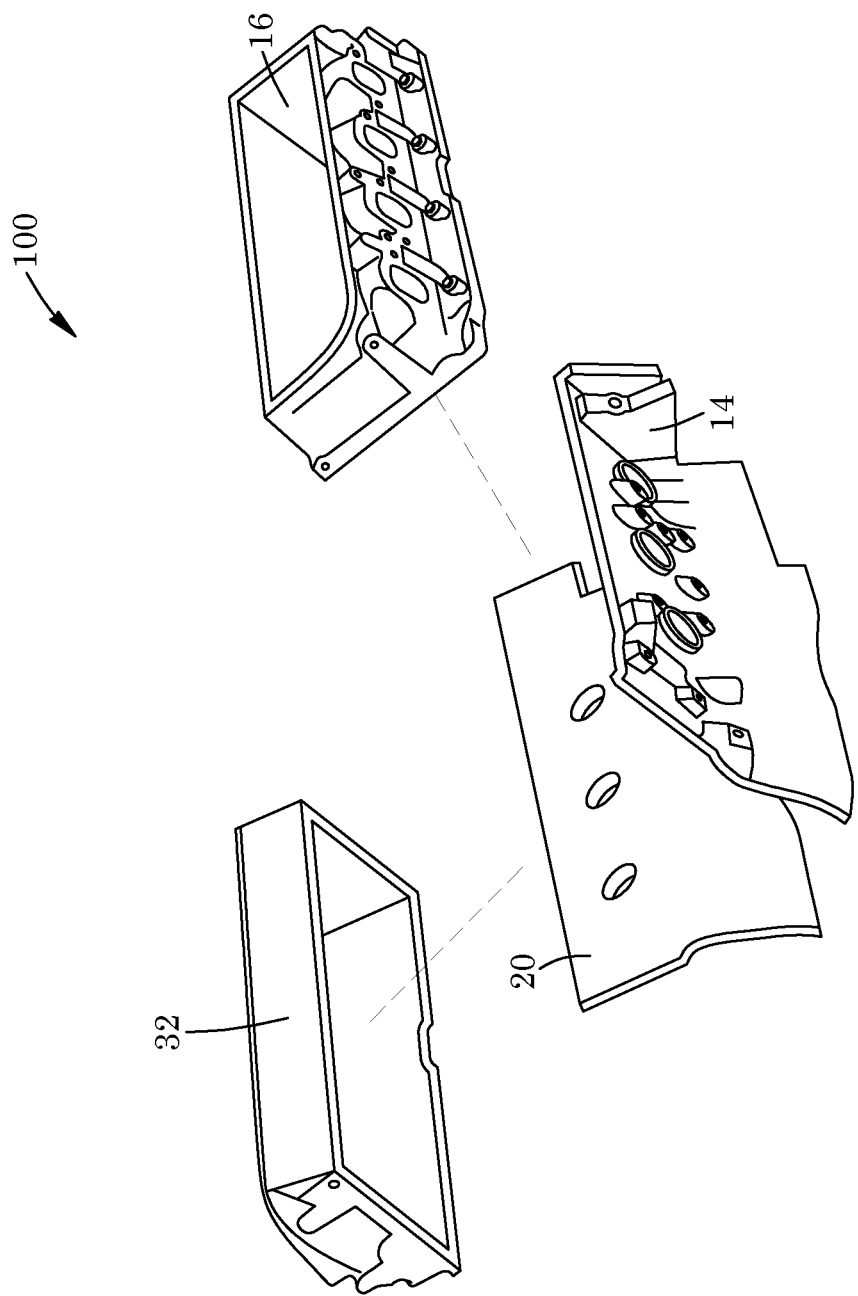
FIG. 5 is a perspective view of another alternative embodiment of the shroud of FIG. 2.

In another embodiment shown in FIG. 5, a single casting, generally referred to as 100 is cast in aluminum. It includes the right side casting 14, the left side casting 20, timing cover 12 and back 22 of the embodiment described in relation to FIG. 3. This is a short block. Additional castings may include the right head casting 16, the left head casting 32 (to provide a long block) and the intake manifold casting 18, or the stock parts may be used as described in relation to FIG. 4A-C.

Figure 6:
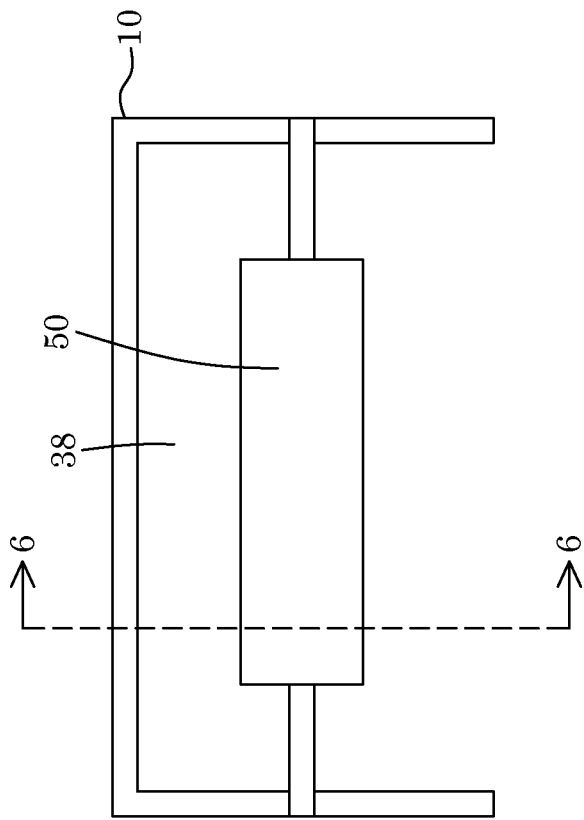
FIG. 6 is a longitudinal sectional view of the shroud of the present technology.

As shown in FIG. 6, the electric motor 50 sits in the motor cavity 38 and is surrounded by air (there is a void volume surrounding the electric motor 10, or in other words, the case 10 and the electric motor 50 are spaced apart from one another, leaving an air gap between the electric motor and the case 10—the case 10 does not touch or sit upon the electric motor 50).

The castings are welded to one another, with the timing cover casting 12 and the back casting 22 both welded to the side castings 14, 20, the right head casting 16 welded to the right side casting 14, the timing cover casting 12 and the back casting 22, the left head casting 32 welded to the left side casting 20, the timing cover casting 12 and the back casting 22, the intake manifold casting 18 welded to the timing cover casting 12, the back casting 22 and the right and left head castings 16, 32.

Figure 7:
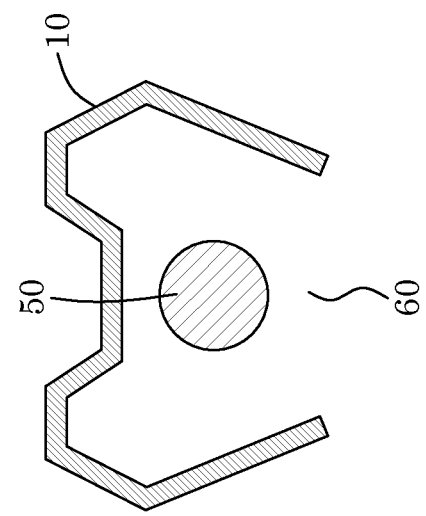
FIG. 7 is a cross sectional view of the shroud of the present technology through line 6 in FIG. 6.

As shown in FIG. 7, the side castings 14, 20 terminate in a lower opening 60. As this is well below the electric motor 50, the electric motor 50 is totally concealed from a viewer, once the shroud 10 and electric motor 50 are mounted in the engine compartment of the now electric car. The lower opening 60 provides further ventilation and cooling for the electric motor 50.

Figure 8:
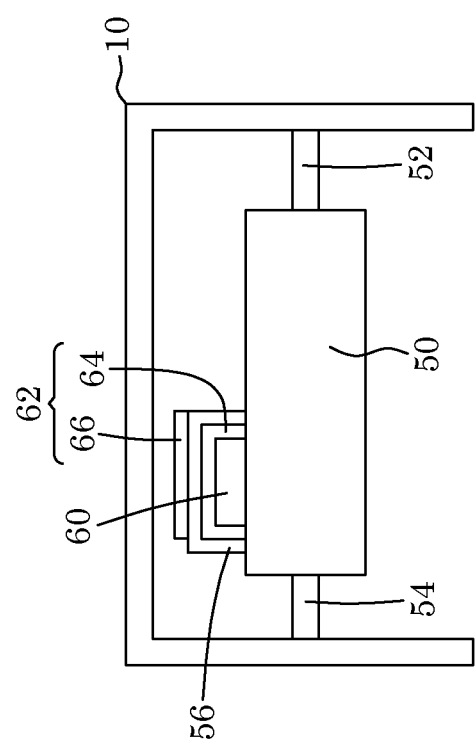
FIG. 8 is a schematic of a side view of the faux engine of the present technology further comprising a microprocessor.

As shown in FIG. 8, the electric motor 50 is in motive communication with the transmission via the rear shaft 52, which is preferably a manual transmission. The front shaft 54 runs the same pulley that the stock V8. This pulley allows for the alternator, power steering, water pump and air conditioning, as included, to run. Wires 56 provide electrical connections between the electric motor 50 and the battery or batteries. The batteries are preferably stored in the trunk or rear of the vehicle.

In one embodiment, the electric motor 50 and the batteries are under control of a microcontroller 60. The microcontroller 60 is in electronic communication with the transmission, the electric motor 50 and the engine peripherals (alternator, power steering, water pump and air conditioning). The microcontroller 60 is housed in a housing 62 which includes a channel 64 and a cooling plate 66. Water from the water pump circulates through the channel 64 and cools the plate 66, thus keeping the microcontroller 60 cool.

Figure 9:
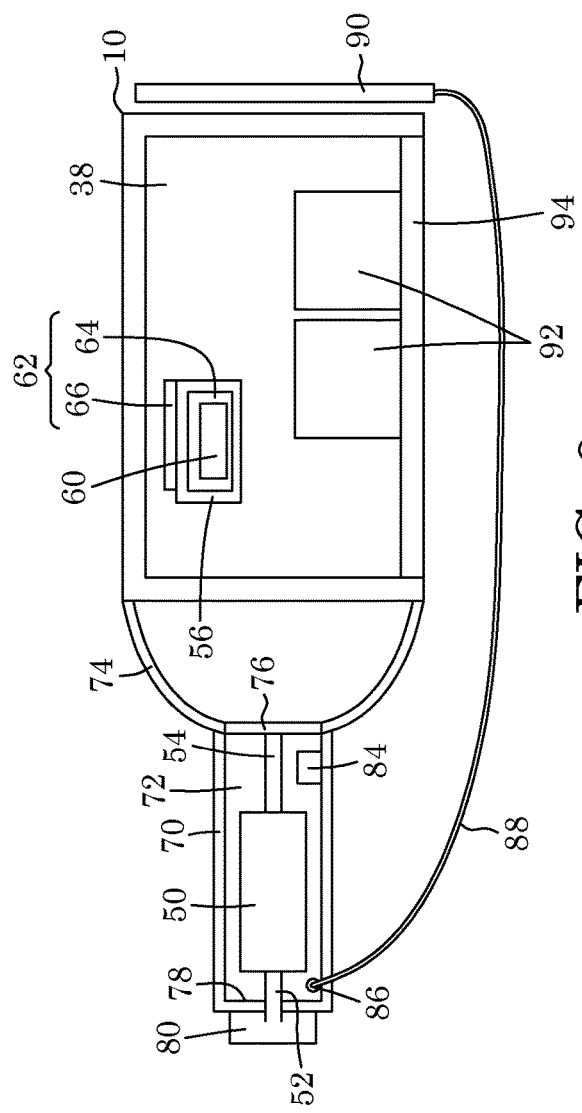
FIG. 9 is a longitudinal sectional view through an alternative embodiment of FIG. 6.

In another embodiment shown in FIG. 9, the electric motor 50 is housed in a faux transmission housing 70, which defines a case 72 and is behind the bell housing 74. The electric motor 50 is surrounded by air (there is a void volume surrounding the electric motor 10, or in other words, the housing 70 and the electric motor 50 are spaced apart from one another, leaving an air gap between the electric motor 50 and the housing 70—the faux transmission housing 70 does not touch or sit upon the electric motor 50). The front shaft 54 is rotatably mounted on a plate 76 which in turn is mounted on the bell housing 74. The rear shaft 52 extends through the back 78 to a gear reduction box 80, which is preferably a Torque Trends gear reduction box.

In an alternative embodiment, the gear reduction box 80 is housed within the faux transmission housing 70 and the rear shaft 52 does not extend through the back 78. A motor microcontroller 84 is mounted in the faux transmission housing 70 and is in electronic communication with the electric motor 50. A water pump 86 is also mounted in the faux transmission housing 70. Water lines 88 extend between it and the radiator 90 for cooling the electric motor 50. A battery management system 60 is housed in the housing 62 in the motor case 38. The housing 62 includes a channel 64 and a cooling plate 66. Water from the water pump circulates through the channel 64 and cools the plate 66, thus keeping the battery management system 60 cool. In an alternative embodiment, the battery management system is cooled with a heat exchanger, which includes a fan. A preferred battery management system is the OrionBMNS. Rechargeable batteries 92, which are preferably lithium-ion batteries, are housed in the engine shroud 10 and sit on the base 94 of the engine shroud 10. The rechargeable batteries 92 power the electric motor 50.

Figure 10:
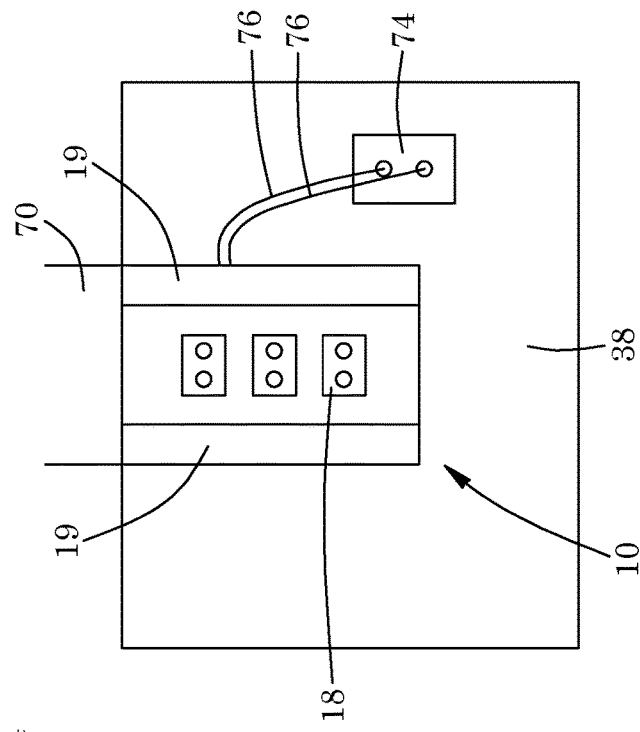
FIG. 10 is a top view of the engine compartment.

As shown in FIG. 10, a pseudo battery 74 houses fuses which are in electrical communication with the electric motor 50 and rechargeable batteries 92. The pseudo battery 74 is a battery case. The wire leads 76 extend from the pseudo battery 74 to the electric engine 50 via the battery terminals on the pseudo battery 74. The engine shroud 10 and the pseudo battery 74 are retained in the engine compartment 38.

Figure 11:
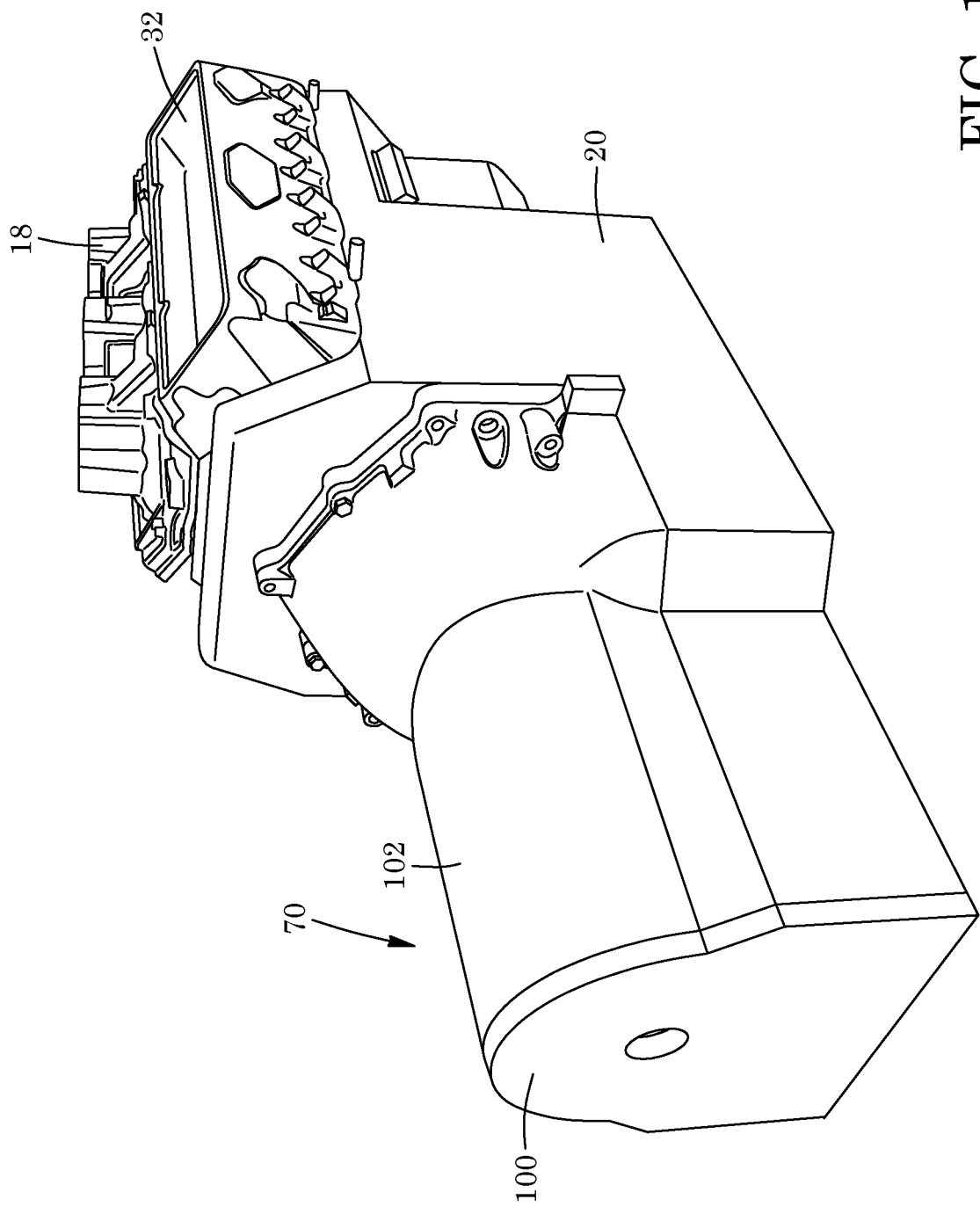
FIG. 11 is a perspective view of the alternative embodiment.

As shown in FIG. 11, the engine shroud 10 with the engine 50 housed in the faux transmission housing 70 mimics the look of a Chevrolet V8 engine, bell housing and transmission, thus there is a faux engine and faux transmission. The intake manifold casting 18, the left head casting 32 and the left side casting 20 can be seen. The side castings 14, 20 extend back and form part of the faux transmission housing 70. In one embodiment the faux transmission housing 70 may be cast as two castings. In another embodiment the faux transmission housing is a back casting 100 and a shaped aluminum sheet cover 102. The valve covers 19 are stock, as they are light weight components.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A combination for transforming an internal-combustion vehicle into an electric vehicle, while retaining the physical appearance of the internal-combustion vehicle, the combination comprising: a faux transmission housing; a bell housing attached to a front end of the faux transmission housing; a faux engine attached to a front of the bell housing; and an electric motor, wherein the combination is free-standing and comprises a plurality of castings assembled to provide a faux transmission case in which the electric motor is housed, and a faux engine case configured to house a plurality of rechargeable batteries.

2. The combination of claim 1, wherein the faux transmission housing is spaced apart from the electric motor to define a void volume surrounding the electric motor.

3. The combination of claim 2, wherein the plurality of castings includes a timing cover casting, a back casting opposite the timing cover casting and a pair of side castings disposed therebetween.

4. The combination of claim 3, wherein the plurality of castings includes a pair of head castings which are hollow, sit on top of the pair of side castings and extend between the timing cover casting and the back casting.

5. The combination of claim 4, wherein the plurality of castings includes an intake manifold casting, which sits between the pair of heads and extends between the timing cover casting and the back casting.

6. The combination of claim 5, further comprising a pair of stock valve covers which are mounted on the pair of heads.

7. The combination of claim 6, further comprising a microprocessor, the microprocessor in electronic communication with the electric motor.

8. The combination of claim 7 wherein the pair of side castings include a plurality of apertures, the faux engine further comprising a plurality of pipes attached to and extending from the apertures to provide a fluid connection between the case and the ambient environment.

9. The combination of claim 8, further comprising the plurality of rechargeable batteries.

10. The combination of claim 9, further comprising: a battery case which is housed in the faux engine; and fuses, which are housed in the battery case and are in electrical communication with the electric motor and the rechargeable batteries.

* * * * *